(12) United States Patent
Hamada

(10) Patent No.: US 7,625,286 B2
(45) Date of Patent: Dec. 1, 2009

(54) ELECTRONIC DEVICE AND A GAME CONTROLLER

(75) Inventor: Nobutoshi Hamada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 375 days.

(21) Appl. No.: 11/121,687

(22) Filed: May 4, 2005

(65) Prior Publication Data

US 2005/0247550 A1 Nov. 10, 2005

(30) Foreign Application Priority Data

May 6, 2004 (JP) .............................. 2004-137833

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/37; 463/36
(58) Field of Classification Search ............. 463/36–38; 200/61.1
See application file for complete search history.

(56) References Cited

U.S. PATENT DOCUMENTS

| | | | | |
|---|---|---|---|---|
| 4,850,591 | A * | 7/1989 | Takezawa et al. .............. 463/37 |
| 5,785,317 | A * | 7/1998 | Sasaki ..................... 273/148 B |
| 6,060,672 | A * | 5/2000 | Sugihara .................... 200/61.1 |
| 6,102,802 | A * | 8/2000 | Armstrong ................... 463/37 |
| 6,153,843 | A * | 11/2000 | Date et al. ................... 200/339 |
| 6,589,118 | B1 * | 7/2003 | Soma et al. ................... 463/38 |
| 6,659,870 | B2 * | 12/2003 | Sobota ......................... 463/37 |
| 7,040,986 | B2 * | 5/2006 | Koshima et al. .............. 463/37 |
| 2002/0165028 | A1 | 11/2002 | Miyamoto et al. |
| 2003/0096650 | A1 | 5/2003 | Eguchi et al. |

(Continued)

FOREIGN PATENT DOCUMENTS

EP 0 470 615 2/1990

(Continued)

OTHER PUBLICATIONS

International Preliminary Report on Patentability dated Nov. 7, 2006, from corresponding International Application PCT/JP2005/008737.

(Continued)

*Primary Examiner*—Dmitry Suhol
*Assistant Examiner*—Kevin Y Kim
(74) *Attorney, Agent, or Firm*—Katten Muchin Rosenman LLP

(57) ABSTRACT

A portable electronic device includes a casing provided with a display on its front face and having ends gripped by both hands of a user, and at least one LR-button provided on a side face of the casing. The LR-button includes: an elongated button body having seizing members on both ends, the seizing members contacting against an inner side of the casing to prevent the button body from being detached from the casing; a deformation member pressed by a back of the button body when the button body is pressed; and switch contacts electrically conducted due to the deformation of the deformation member. When one end of the button body is pressed, the button body pivots about a contact point where said seizing means provided on the other end of the button body comes into contact with the casing.

15 Claims, 12 Drawing Sheets

U.S. PATENT DOCUMENTS

2004/0048665 A1 3/2004 Ogata et al.

FOREIGN PATENT DOCUMENTS

| GB | 2 270 965 | 3/1994 |
|---|---|---|
| JP | 2-77823 | 6/1990 |
| JP | 4-42029 | 4/1992 |
| JP | 2003-157129 | 5/2003 |
| KR | 1997-0005724 | 6/1997 |

OTHER PUBLICATIONS

International Search Report dated Aug. 31, 2005.
Written Opinion of the International Searching Authority dated Aug. 31, 2005.
Notice of Preliminary Rejection, dated Aug. 26, 2008, for corresponding Korean Patent Application 10-2006-7025657.
Notification of Reason(s) for Refusal dated Nov. 18, 2008, from the corresponding Japanese Application.

* cited by examiner

PRIOR ART

ELECTRONIC DEVICE AND A GAME CONTROLLER

BACKGROUND OF THE INVENTION

1. Field of the Invention

The present invention relates to a structure of a portable electronic device or a game controller, and in particular, to a structure of buttons provided for the portable electronic device or the game controller.

2. Description of the Related Art

There are some game controllers having not only buttons on a front face of the controller but also buttons even on one of side faces (that is, faces other than a front face and rear face) of the controller in order to realize various inputs for more and more complicated games. Such buttons on the side face have, for example, a horizontally long shape and are also called as an L-button and an R-button (hereinafter, also collectively referred to as "LR-buttons"). The LR-buttons are generally pressed down with forefingers of a user gripping the controller.

A conventional structure of each of the LR-buttons is shown in FIG. 13A. As shown, a horizontally long button body 200 is tiltably supported by its one end 206 as a supporting point. A switch contact 204 is attached to a rubber 202 positioned below the button body 200. When a user presses down the button body 200, the button body 200 slightly pivots about the end 206 to move downward as shown in FIG. 13B, and then the button body 200 pushes the rubber 202 downward to allow the switch contact 204 to be electrically conducted. When the user takes the finger off the button body 200, the button body 200 is pushed up by repulsion of the rubber 202 to put the button body 200 to its original position (for example, see Japanese Utility Model Laid-Open Publication No. H4-42029).

However, since the size of the user's hands operating the controller greatly differs depending on the age, the sex or the like, the position of the fingertip on the LR-buttons also varies. In the case of the LR-buttons having the above-described structure, when the user presses down the vicinity of the end 206 of the button body 200, the button body 200 moves downward insufficiently. As a result, in some cases, the switch contact 204 is not electrically conducted as expected or the user can hardly be sure if the LR-buttons are sufficiently pressed.

SUMMARY OF THE INVENTION

The present invention was devised in view of the above problem and has an object of providing a technique for ensuring that LR-buttons sufficiently moves downward regardless of the pressed position of the button to improve the operational comfort of a user.

One aspect of the present invention relates to an electronic device. The device comprises a casing. The casing is comprised of a front face, a rear face and one or more side faces, and having an opening at any one of four corners of the casing. The device further comprises an elongated button being fitted into the opening, the button having a pressed face by a user's finger situated along the longitudinal direction of the button. The pressed face of the button and one side face of the casing, which is one of two side faces forming one corner of the casing where the opening is situated, forms substantially continuous plane. The button further comprises seizing means on each end which extends in each direction of two side faces forming the corner of the casing where the opening is situated, so as to prevent the button from being detached from the opening of the casing.

DETAILED DESCRIPTION OF THE PREFERRED EMBODIMENTS

Figure 1:
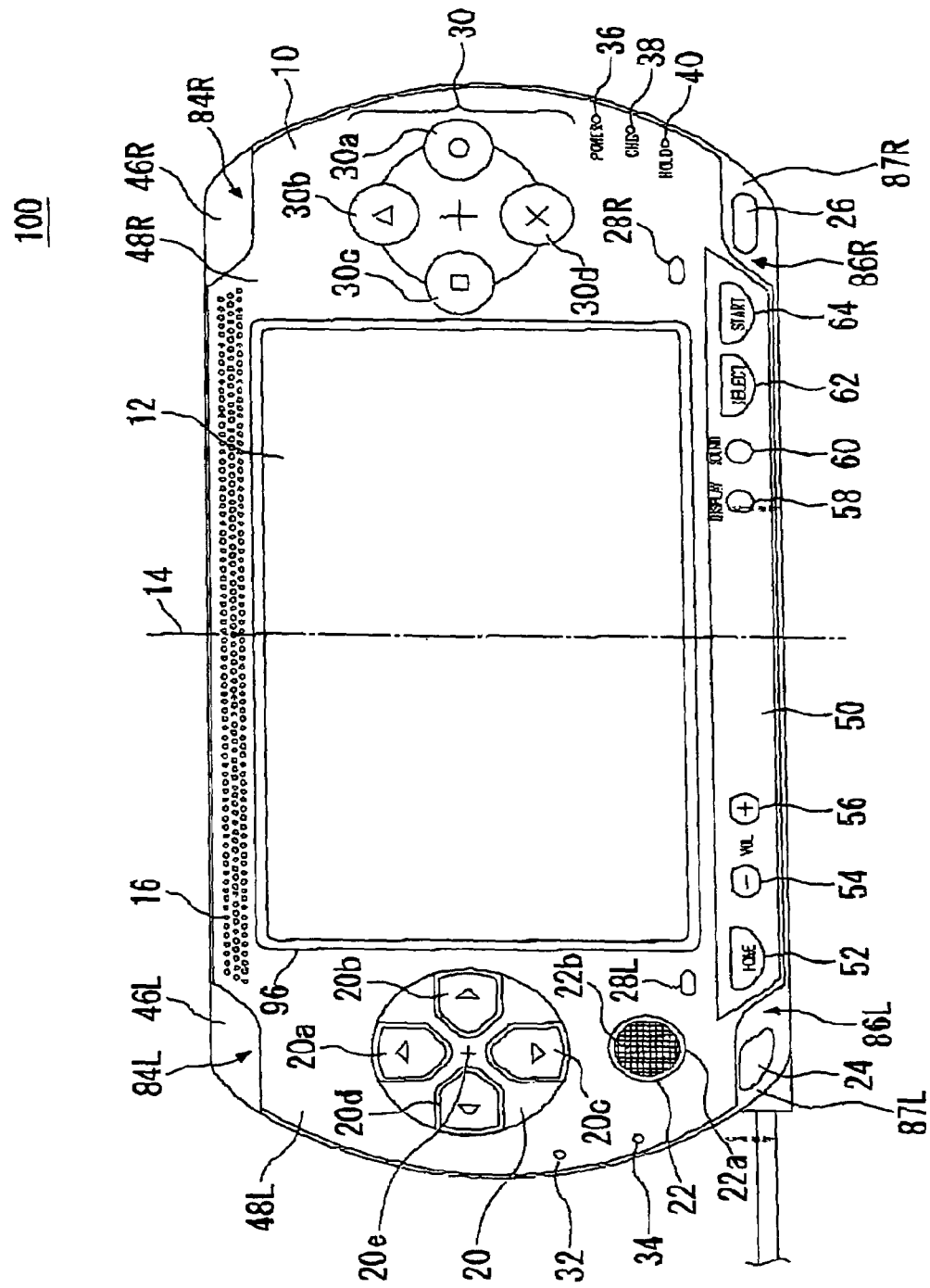
FIG. 1 is a front view of a portable electronic device according to one embodiment of the invention.

FIGS. 1 through 6 are views showing the appearance of a portable electronic device 100 according to one embodiment of the present invention. FIG. 1 is a front view of the portable electronic device 100. A casing 10 has a horizontally long oval shape as a whole. Each end of the casing 10 is formed in a circular curve shape with its center decentered from a center line 14 by a certain distance.

Figure 2:
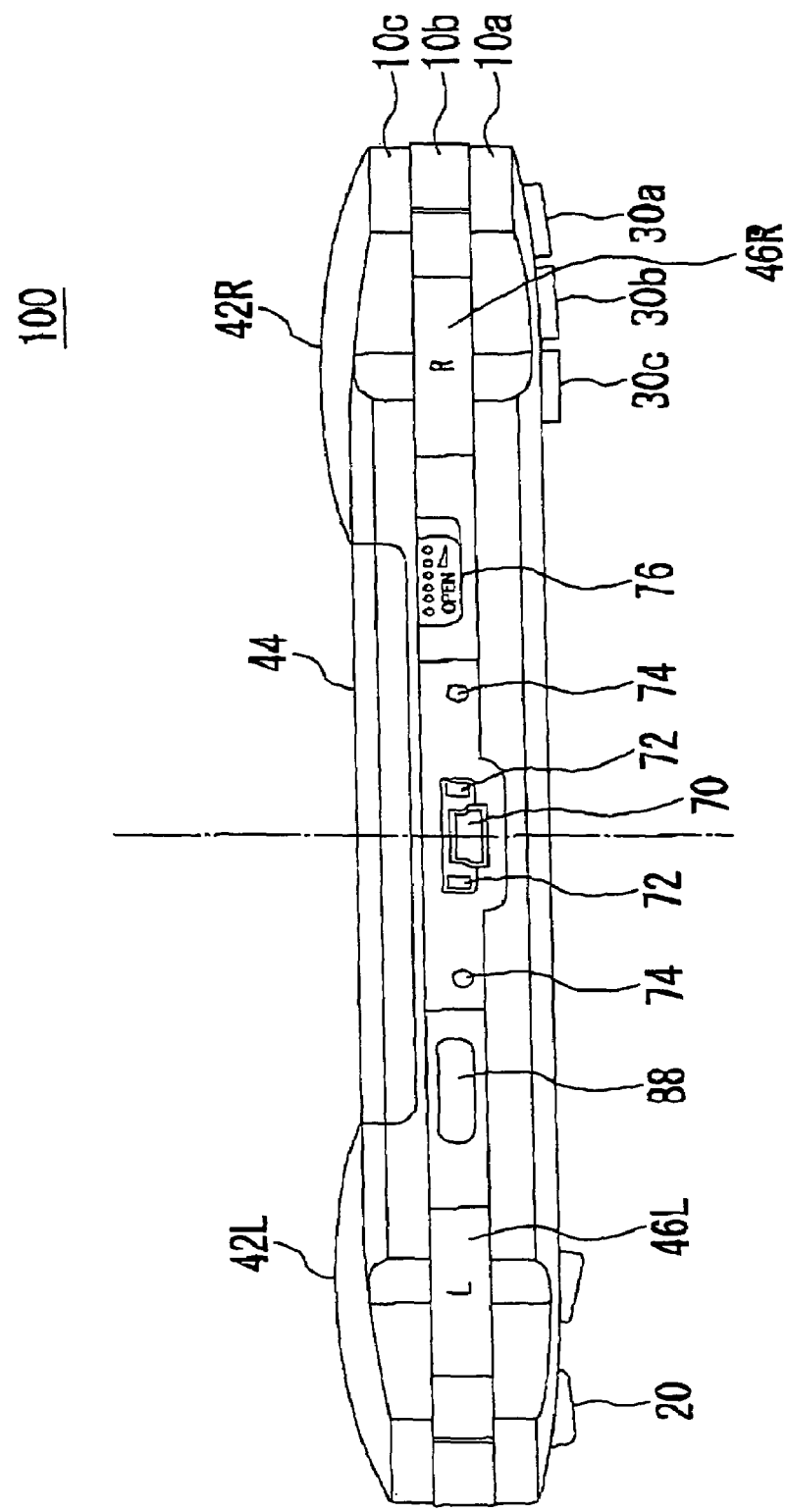
FIG. 2 is a top side view of the portable electronic device.
Figure 4:
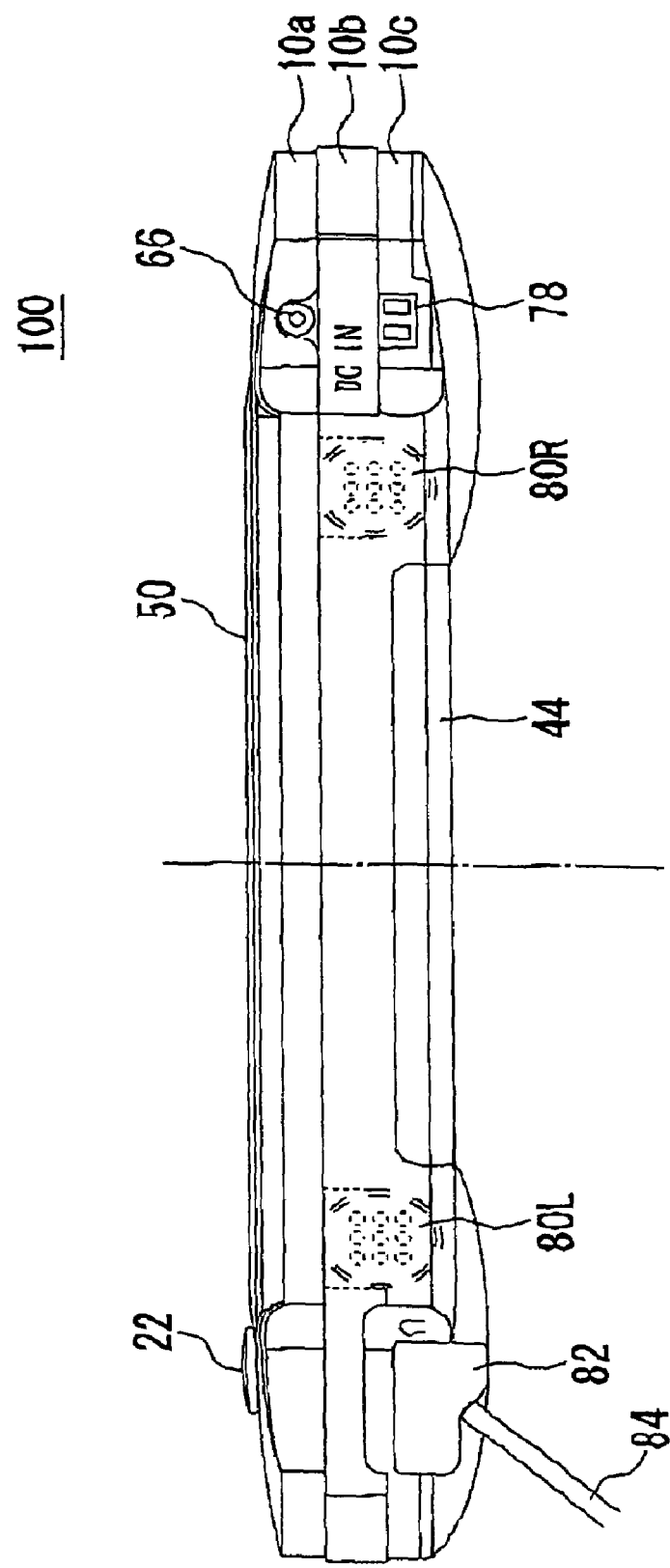
FIG. 4 is a bottom side view of the portable electronic device.

As shown in FIGS. 2 and 4, the casing 10 is composed of an upper part 10a, an intermediate part 10b, and a lower part 10c. The casing 10 has a hollow body. Inside the casing 10, a circuit board (not shown) is provided. The circuit board includes: switch contacts for generating a signal by the operation of various corresponding buttons; a CPU which processes the signals so as to execute various computations; a sound processor for outputting a sound; and an image processor for outputting an image. The intermediate part 10b has a higher rigidity than those of the upper part 10a and the lower part 10c to ensure the rigidity of the entire casing 10.

Returning to FIG. 1, a liquid crystal display 12 (hereinafter, abbreviated as an "LCD 12") serving as a display device is fit into the center of the upper part 10a of the casing 10. The LCD 12 displays, for example, a game screen when the portable electronic device 100 functions as a game machine or displays a schedule or an address list when the portable electronic device 100 functions as a personal digital assistant (PDA). The LCD 12 is fit into the upper part 10a of the casing 10 through a frame 96.

The surface of the casing 10, that is, the front face being opposite to the user is mainly composed of: a left-hand area 48L gripped by the left hand of the user; a right-hand area 48R gripped by the right hand of the user; the LCD 12; a horizontally long button area 50 positioned below the LCD 12, where various buttons are provided; and a decorative area 16 positioned above the LCD 12. Notches 84L and 84R are formed on an upper left corner and an upper right corner of the upper part 10*a* of the casing 10, respectively.

In the left-hand area 48L, an arrow key 20 mainly for inputting a direction indication and an analog device 22 mainly for analog input of the direction indication are provided. The detailed structures and functions thereof will be described below. Indicators 32 and 34 are also provided in the left-hand area 48L. The indicator 32 lights up during access to a removable recording medium, and the indicator 34 lights up during WLAN communication.

The horizontal center of the analog device 22 is located closer toward the center line 14 of the casing 10 than the horizontal center of the arrow key 20. The analog device 22 is located closer to the lower left corner of the device than the arrow key 20. The reason for this arrangement is as follows. When the left thumb of the user moves between the arrow key 20 and the analog device 22 at the time that both sides of the device are held by the user's hands, the user pivotally moves his thumb with his palm on the lower left corner of the casing 10 as a supporting point. And the user tilts the center of the analog device 22 for operation. Therefore, the operation is facilitated when the analog device 22 is positioned closer to the center of the casing 10.

In the right-hand area 48R, buttons 30*a*, 30*b*, 30*c* and 30*d* (hereinafter, also collectively referred to as "button keys 30") are provided mainly for inputting a unique instruction. A structure and functions of the button keys 30 will be described below. Additionally, indicators 36, 38 and 40 are provided in the right-hand area 48R. The indicator 36 lights up when the portable electronic device 100 is ON. The indicator 38 lights up while the portable electronic device 100 is being charged. The indicator 40 lights when the portable electronic device 100 is in a hold status where every key of the portable electronic device 100 is invalid.

As shown in FIG. 1, the center of the arrow key 20 and the center of the button keys 30 are preferably shifted upward from the horizontal center line of the casing 10 in the vertical direction.

The center of the arrow key 20 and the center of the button keys 30 are preferably located at the same distance from the center line 14 of the casing 10 in the horizontal direction. Each distance between pressed faces 20*a*, 20*b*, 20*c* and 20*d* on a disc-like key top of the arrow key 20 is preferably set smaller than that between the buttons 30*a*, 30*b*, 30*c* and 30*d*. The reason for this arrangement is as follows. Since the arrow key 20 is mainly used to direct the vertical and horizontal movements, the user often keeps operating the arrow key 20. Therefore, it is preferable that the user can operate the arrow key 20 without taking his thumb off the pressed faces of the arrow key 20. In this regard, it is easier for the user to operate the arrow key 20 if the pressed faces 20*a*, 20*b*, 20*c* and 20*d* are not quite distant from each other. On the other hand, the button keys 30 are often used to give different instructions by respective buttons 30*a*, 30*b*, 30*c* and 30*d*. Therefore, since it is easier for the user to operate taking his thumb off the button keys 30, it is preferable that the buttons 30*a*, 30*b*, 30*c* and 30*d* are located with a certain distance.

Below both ends of the LCD 12, a speaker hole 28L is provided in the left-hand area 48L, and a speaker hole 28R is provided in the right-hand area 48R to provide a sound for the user.

The button area 50 is located in the vicinity of an outer edge of the upper part 10*a* of the casing 10 on the side closer to the user holding the portable electronic device 100. In the button area 50, buttons 52 to 64 are located. Preferably, the button area 50 is constituted so as to be visually distinct from the left-hand area 48L and the right-hand area 48R. In this embodiment, the button area 50 is formed in a horizontally extending elongated hill-like shape. The button area 50 is elevated above the level of the plane formed by the left-hand area 48L, the right-hand area 48R and the LCD 12. In the vicinity of the top of the hill, various buttons 52 to 64 are provided. With this arrangement, the user can visually distinguish the buttons to be operated during gameplay or an application operation from the other buttons. Furthermore, since the button area 50 is elevated, the user can be tactilely aware of the arrangement of these buttons 52 to 64. The elevated shape of the button area 50 also serves to protect the LCD 12.

The structure of the button area 50 is not limited to the above-described structure. Any structure may be employed as long as the height of the button area 50 differs from the height of the left-hand area 48L and the right-hand area 48R. Herein, the "height" means a height based on a horizontal plane, on which the casing 10 is placed so that its front face carrying the LCD 12 is oriented upward. For example, an elongated step having a trapezoidal or rectangular cross section may be provided to arrange the buttons 52 to 64 thereon. Alternatively, walls having the greater height than that of the buttons 52 to 64 may be provided above and below the buttons 52 to 64 arranged on the same plane with the left-hand area 48L, the right-hand area 48R and the LCD 12. With these walls, the buttons 52 to 64 are not easily pressed down by the user's hands operating the arrow key 20 or the button keys 30.

The buttons 52 to 64 arranged in the button area 50 are not frequently used for gameplay or a main operation of the other applications, and therefore the buttons 52 to 64 are not required to be frequently pressed. A home button 52 is used to turn the LCD 12 back to a main screen. A volume buttons 54, 56 serve to decrease/increase the volume of a sound reproduced through a speaker or a headphone, respectively. A display button 58 turns ON/OFF a backlight of the LCD 12. A sound button 60 turns ON/OFF a sound output. A select button 62 serves for selecting one item from items displayed on the LCD 12. A start button 64 mainly serves to start a game when a game program is being executed.

In a conventional portable electronic device or game controller, such buttons 52 to 64 are provided, for example, below the arrow key or the button keys, not at a part distant from the part where the arrow key or the button keys are formed as described above. With such conventional arrangement, when the user operates the arrow key or the button keys, the finger of the user carelessly touches such buttons, sometimes leading to an erroneous operation. On the other hand, according to this embodiment, since the buttons 52 to 64 are arranged so as to be distant from the arrow key or the button keys, erroneous operations are reduced.

Notches 86L and 86R are also formed on the lower left corner and the lower right corner of the upper part 10*a* of the casing 10 as on the upper left corner and the upper right corner. Below the notches 86L and 86R, grip parts 87L and 87R are provided, respectively. A hole 24 is formed in the grip part 87L to allow a strap (not shown) or the like to be passed therethrough and tied. A cover 26 is provided below the grip part 87R. The cover 26 has a hinge on its right end. When a user uses a DC power source, the cover 26 opens downward in FIG. 1 with the hinge as a supporting point.

When the portable electronic device 100 according to this embodiment is used, the forefingers are placed on the top side face of the casing 10 so that the left thumb is placed above the arrow key 20 or the analog device 22 and the right thumb is placed above the button keys 30, as described with reference to FIG. 7. The other fingers are placed so as to cover dome-like bulges on the rear face of the casing 10. In this manner, the curve formed by the forefingers fits to the shape of the left and right side faces of the casing to help the user's grip. At the same time, the weight of the casing 10 is kept by the middle fingers to the little fingers. Therefore, even if the thumb or the forefinger is moved for operation, the remaining fingers can stably support the portable electronic device 100.

FIG. 2 is a top side view of the portable electronic device 100. As described above, dome-like bulges 42L and 42R (hereinafter, also collectively referred to as "bulges 42") are formed on both ends of the rear face of the casing 10. A plane is formed between the two bulges 42. Almost the entire plane is an open-cover part 44 of a small disc drive. By sliding a switch 76 provided in the intermediate part 10b, the cover opens upward in FIG. 2 so that a small disc can be loaded on a disc drive (not shown) below the open-cover part 44. The small disc drive provides an application program or a game program for the portable electronic device 100. An L-button 46L and an R-button 46R (hereinafter, also collectively referred to as "LR-buttons 46") are buttons respectively operated by the left forefinger or left middle finger and the right forefinger or right middle finger of the user. The LR-buttons 46 are preferably used for giving a special instruction that cannot be commanded only with the arrow key 20 or the button keys 30. For example, when a game screen is displayed on the LCD 12, the LR-buttons 46 may be operated for a special action of a character in the game (for example, a fighting stance or a squatting position), firing a special weapon and the like. The detailed structure of the LR-buttons 46 will be described below.

By providing the dome-like bulges 42 for grip on the rear face of the casing 10, the fingertip of the user is unlikely to touch the open-cover part 44 of the small disc drive, preventing a large force from being applied to the disc drive. Furthermore, the dome-like bulges 42 are provided on both ends of the rear face of the casing 10. Therefore, even if the portable electronic device 100 is placed on a plane, the open-cover part 44 of the small disc drive does not come into contact with the plane. As a result, a stable operation of the disc drive is ensured to decrease read errors. At the same time, the small disc drive is less prone to breakage.

As can be seen from FIG. 2, the tops of the arrow key 20 and the button keys 30 are higher than the maximum height of the casing 10 when the casing 10 is placed on a horizontal plane so that the rear face (face without the LCD 12) is oriented downward. Therefore, even if the casing 10 is placed so that the front face (face with the LCD 12) is oriented downward, the LCD 12 is not worn. Furthermore, as shown in FIG. 2, the casing 10 has a circular curve cross section so that its thickness decreases from its center toward both ends. The arrow key 20 and the button keys 30 are arranged so as to be inclined toward the ends of the casing 10 in accordance with the curve shape of the casing 10. This arrangement helps the user to grip the casing 10 and improves the operability of the arrow key 20 and the button keys 30.

In the intermediate part 10b of the casing 10, an input terminal 70 for an external device and attachment holes 74 for fixing the external device to the casing 10 are provided. Using the input terminal 70 for connection with the external device, the portable electronic device 100 can be used as an input device for a personal computer or the like in place of a key board or a mouse, for example. Examples of the external device include a digital camera, a GPS device and the like. A switch 76 for opening the cover of the small disc drive and an infrared port 88 for infrared communication are also provided in the intermediate part 10b.

Figure 3:
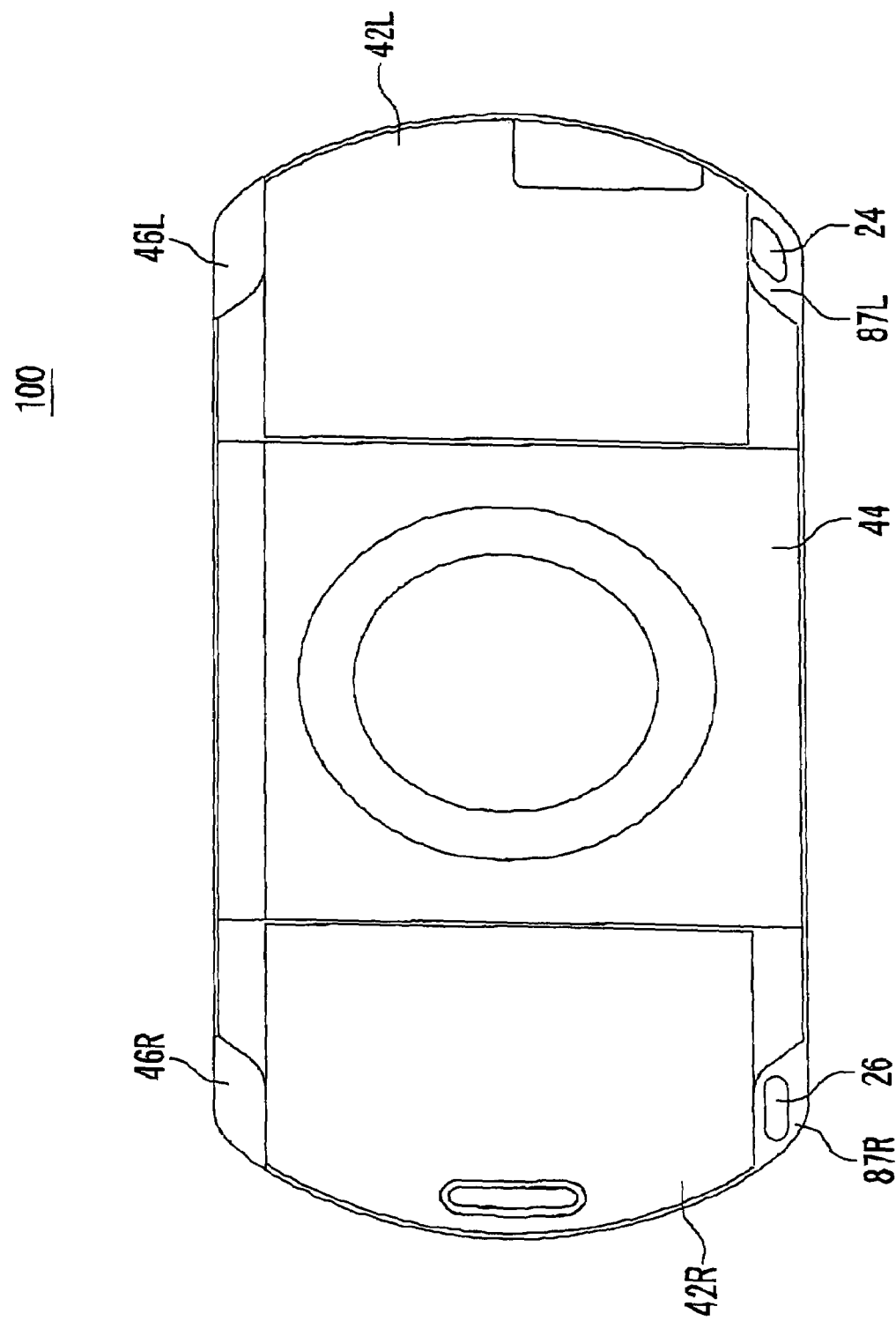
FIG. 3 is a rear view of the portable electronic device.

FIG. 3 is a rear view of the portable electronic device 100. As described above, the dome-like bulges 42R and 42L are provided on the both ends of the rear face of the portable electronic device 100. Between the bulges 42R and 42L, the open-cover part 44 of the small disc drive is provided.

FIG. 4 is a bottom side view of the portable electronic device 100. As indicated with a dotted line in FIG. 4, speakers 80L and 80R are provided in the casing 10. A plug 82 for a code 84 connected to a headphone (not shown) or a remote controller (not shown) is inserted into a terminal provided in the casing 10. On the right of the upper part 10a, a terminal 66 for supplying DC power from external power supply to the portable electronic device 100 is provided. On the right of the lower part 10c, an electrode 78 is provided for supplying electric power from a so-called "cradle" to the portable electronic device 100 when the portable electronic device 100 is placed on the cradle. When the grip parts 87L and 87R are fit into corresponding receiving parts provided on the cradle (not shown), the portable electronic device 100 can be fixed to the cradle.

Figure 5:
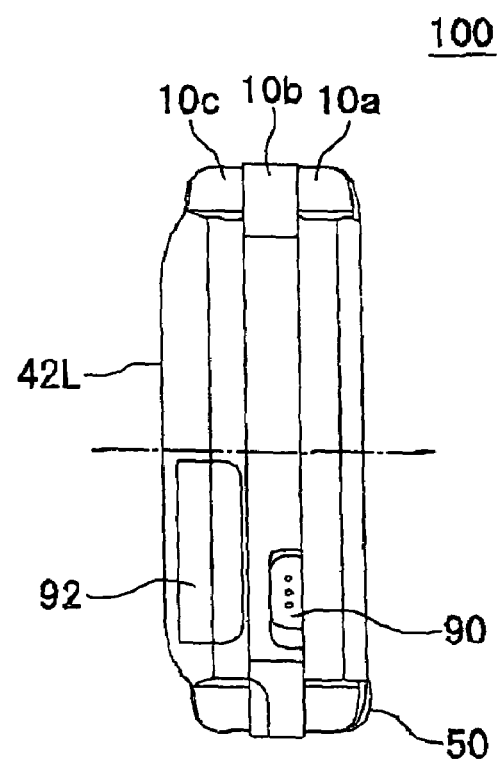
FIG. 5 is a left side view of the portable electronic device.
Figure 6:
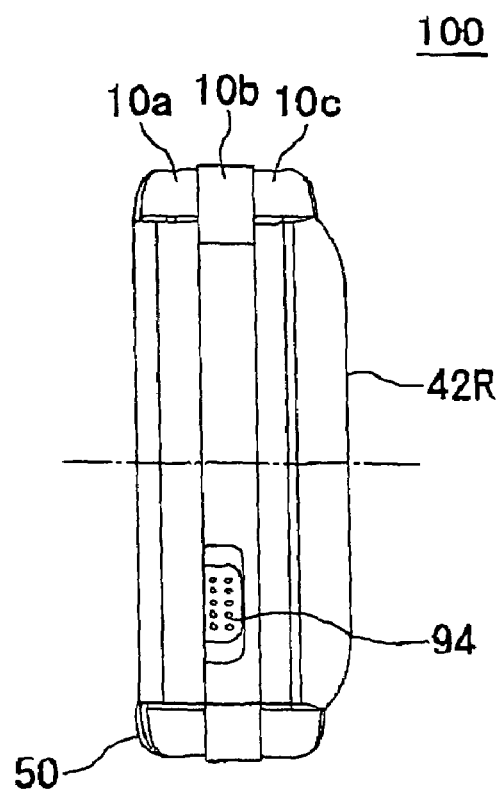
FIG. 6 is a right side view of the portable electronic device.

FIG. 5 is a left side view of the portable electronic device 100. A WLAN switch 90 is provided in the intermediate part 10b, and an insert slot 92 for inserting a removable recording medium is provided in the lower part 10c. FIG. 6 is a right side view of the portable electronic device 100. A power switch 94 for switching ON/OFF the portable electronic device 100 is provided in the intermediate part 10b.

Figure 7:
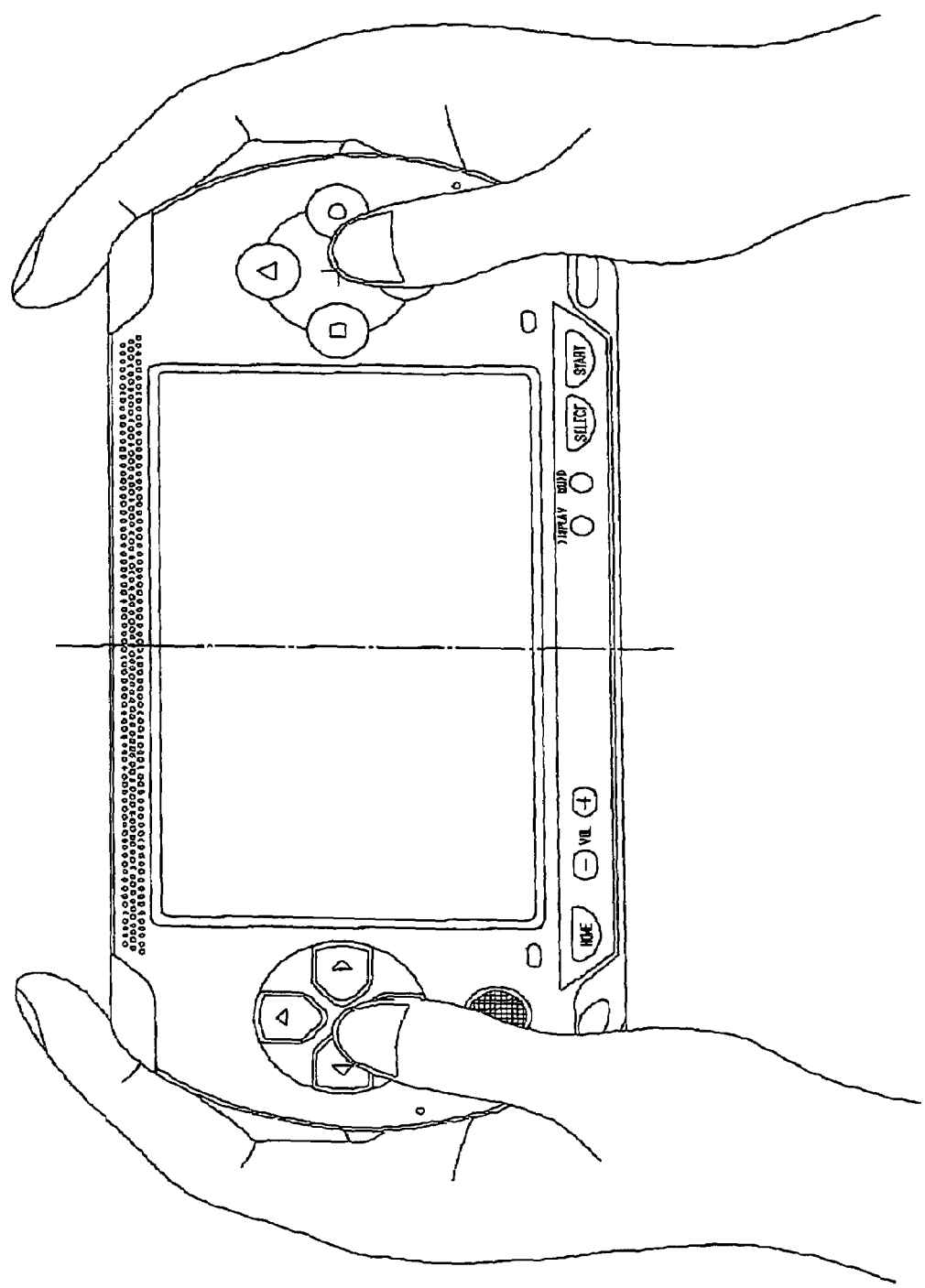
FIG. 7 is a view showing how the portable electronic device is gripped by both hands of the user.

FIG. 7 is a view showing how the portable electronic device 100 is gripped by the user. The portable electronic device 100 is basically operated while being held by the user's both hands. The right and left ends of the casing 10 are held by the right and left hands, respectively. As shown in FIG. 7, the user's left hand is slightly flexed to hold the casing 10 along the arc shape side of the left-hand area 48L of the casing 10. At this time, the left thumb of the user is placed on the arrow key 20 to operate the arrow key 20. Similarly, the user's right hand is also slightly flexed to hold the casing 10 along the arc shape side of the right-hand area 48R. The right thumb of the user is placed on the center of the button keys 30 to operate the button keys 30. Only the user's forefingers or forefingers and middle fingers are slightly flexed and are placed on the LR-buttons 46. The LR-buttons 46 are operated by the forefingers or middle fingers. It is preferable that a thickness of the casing 10 be about two to four centimeters so that the user can easily hold the portable electronic device 10.

The user's middle finger, ring finger and little finger, or ring finger and little finger are put on the rear face of the casing 10 while being slightly flexed to support the weight of the portable electronic device 100. As described above, the dome-like bulges 42 are provided at both ends of the rear face of the casing 10 so as to fit to the curve of the user's fingers. For example, the dome-like bulges 42 are made of a plastic material. A slip-resistant material such as a rubber or a metal material may be used. Each of the dome-like bulges 42 has a smooth arc cross section as shown in FIG. 2 or FIG. 4. Alternatively, steps may be put on the bulges 42 for receiving the user's fingers, or a plurality of small protrusions may be formed on its surface to improve the resistance against slip. The bulges 42 make it easier to grip the portable electronic device 100. Therefore, even if the device 100 is vibrated strongly by the user while a game is being played with the device, the operability is hard to be degraded. Moreover, since the fingers and palms are naturally flexed to fit to the arc shape of both ends of the casing 10 and to the dome-like bulges 42 on the rear face of the casing 10, the portable electronic device 100 fits comfortably in the user's hands. Therefore, even if the user holds the portable electronic device 100 for a long time, the user feels hardly tired. Furthermore, since the weight of the portable electronic device 100 is supported by the middle fingers, ring fingers and little fingers, the portable electronic device 100 can be stably held even when the user releases his thumb or forefinger off the buttons.

The portable electronic device 100 has a plurality of functions. As an example, the portable electronic device 100 functions as a game machine. The user inserts a disc storing a game program therein into the small disc drive provided on the rear face of the casing 10 to play a game. More specifically, when the power switch 94 is turned ON after loading the disc, the game program is read out from the small disc to display a start screen on the LCD 12. When the start button 64 is pressed in this state, the game starts. When the user operates the arrow key 20, the analog device 22, or the button keys 30 to select menu items or to operate a character displayed on the screen, the input signal is transmitted to the CPU. The CPU makes the game progress in accordance with the input signals and the game program.

In another example, the portable electronic device 100 also functions as a music player. The user loads a disc storing music data therein into the small disc drive or inserts a removable recording medium to listen to recorded music. In this case, the user uses the arrow key 20 or the analog device 22 to select a title of the song from the titles displayed on the LCD 12 which the user would like to listen to. The selected music data is converted into analog sounds by the sound processor (not shown) to be output from the speaker holes 28 or a headphone.

The functions of the portable electronic device 100 are not limited thereto. The portable electronic device 100 may have functions such as an address list, a schedule, a memo pad, an E-mail communication, and the like as is the case of a conventional personal digital assistant (PDA).

The overall configuration of the portable electronic device 100 according to this embodiment has been described above. Next, the configuration and the function of each button will be described in detail.

Figure 8A:
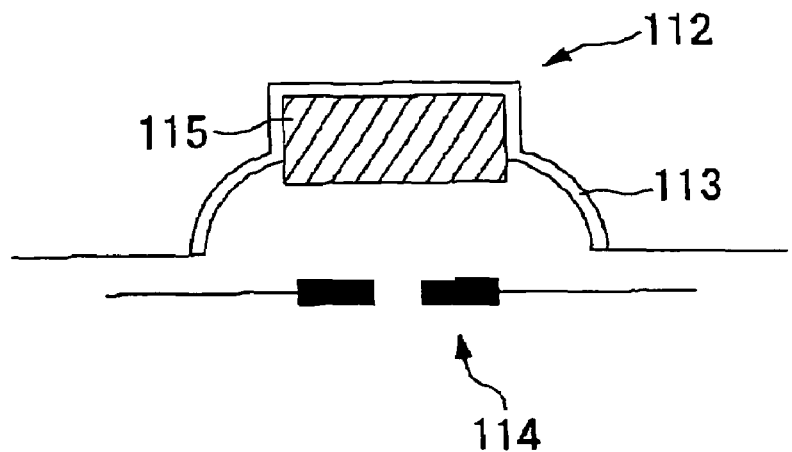
FIGS. 8A and 8B are views, each showing a structure of an input button.
Figure 8B:
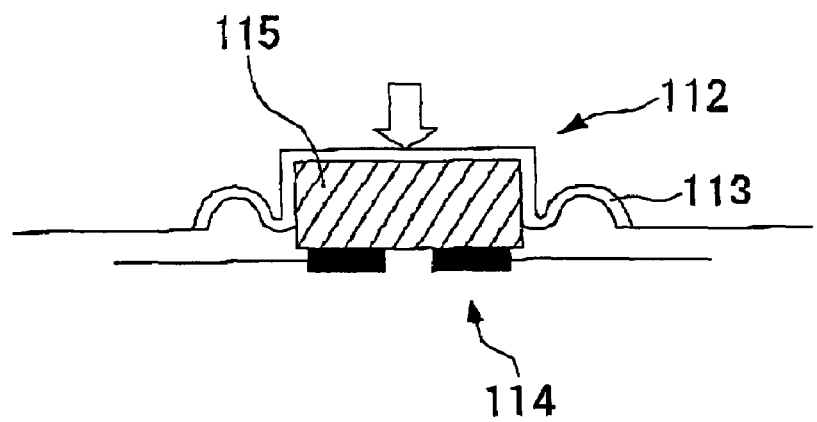

FIGS. 8A and 8B are schematic views, each showing a structure of the input button. When the arrow key 20, the button keys 30, the L-button 46L, the R-button 46R, and the buttons 52 to 64 are pressed down, they output digital signals in response to the press operation. More specifically, when a button body (not shown) of each button is pressed down, a deformation member 112 provided below the button body is pressed and moves downward. The deformation member 112 includes a flexible leg 113 shown in FIG. 8A. Upon application of a predetermined or larger load, the leg 113 is greatly deformed as shown in FIG. 8B. A conductive member 115 is attached to the deformation member 112. On a substrate below the conductive member 115, switch contacts 114 separated from each other are provided. By the deformation of the leg 113, the conductive member 115 comes into contact with the switch contacts 114. Then, the switch contacts 114 are electrically conducted to transmit an ON signal of the switch to the CPU as a digital output. When the user takes the finger off the button body (not shown), the elasticity of the leg 113 puts the button body back to its original position as shown in FIG. 8A. By appropriately designing the shape and the elasticity of the leg 113 of the deformation member 112, the user can feel a "click" of the input button. Therefore, the user can confirm his operation.

1. Arrow Key

The arrow key gives a discrete direction indication for eight directions, that is, up, down, right and left, plus four directions between them, for example. As shown in FIG. 1, the arrow key 20 comprises the convex faces 20a, 20b, 20c and 20d corresponding to four directions (up, down, right, and left) on the surface of the disc-like key top. The disc-like key top is tiltably supported by a supporting point 20e at the center of the key top, which is able to tilt in the eight directions described above. The deformation member, the conductive member, and the switch contacts described above are provided below each of the pressed faces 20a, 20b, 20c and 20d. When any one of the convex faces 20a, 20b, 20c and 20d of the arrow key is pressed down, only the switch contacts below the pressed convex face is turned ON. The turned-ON switch contacts leads to move a character in the vertical and horizontal directions in the game or to select an item from those listed in the menu screen. Since each of the convex faces 20a, 20b, 20c and 20d of the arrow key 20 is formed in a convex shape, the user can perform a desired operation without directly viewing the arrow key 20. Since the top of the convex faces is formed to be higher than the maximum height of the casing 10, the surface of the LCD 12 can be protected even when the casing 10 is placed as the LCD 12 is oriented downward. Moreover, since the disc-like key top is slant toward its center in a cone shape, it is easy to put the thumb on the center to ensure the operation of the arrow key 20.

2. Analog Device

The analog device 22 is used to continuously give a direction indication in 360 degrees. The analog device 22 includes a hole 22a formed in the front face of the casing 10, an operation pad 22b, and detection means (not shown). The operation pad 22b passes through the hole 22a and is constructed to be longitudinally and horizontally movable in the hole 22a. The operation pad 22b is made of, for example, a rubber. The detection means converts the amount of movement and the direction of movement of the operation pad 22b into an electric signal.

The operation pad 22b of the analog device 22 is biased toward the center of the hole 22a by a spring or the like. When the user does not operate the operation pad 22b, the operation pad 22b is positioned in the center of the hole 22a. In operation, the user can tilt the operation pad 22b in 360 degrees. Since the stroke of the tilting is set to about 2 mm, the user can tilt the operation pad 22b for minute input to great input.

With such a structure, the portable electronic device 100 according to the embodiment can realize the game controller with same functions as those of a so-called "joystick" and have high operability in spite of its small size.

The input transmitted by the detection means as an analog signal is converted into a digital signal by an analog/digital converter (not shown) provided on the substrate, which is then transmitted to the CPU. The CPU performs a computation based on the program to display the image in accordance with the user's input on the LCD 12.

The input from the arrow key 20 and the input from the analog device 22 may be easily switched by the software process. Alternatively, an analog switch for switching the input between the arrow key 20 and the analog device 22 may be provided on the portable electronic device 100.

3. Button Keys

As shown in FIG. 1, the button keys 30 are composed of the buttons 30a, 30b, 30c and 30d. On the surfaces of cylindrical key tops of the buttons 30a, 30b, 30c and 30d, circle, triangle, square, and cross signs are printed, respectively. Each of the buttons 30a, 30b, 30c and 30d is used to input a single instruction. The deformation member, the conductive member, and the switch contacts described above are provided below each of the buttons 30a, 30b, 30c and 30d. When any one of the buttons 30a, 30b, 30c and 30d is pressed down, only the switch contact below the pressed face is turned ON. The correlation between the type of input and each button 30a, 30b, 30c or 30d differs depending on the type of the game program or the application running on the portable electronic device 100. For example, the buttons 30a, 30b, 30c and 30d are used for input such as an attack in a game, item acquisition, menu screen display, item selection, or response to inquiry.

The buttons 30a, 30b, 30c and 30d are provided at predetermined spacing so as to be placed at the four apexes of the square, as shown in FIG. 1. Therefore, if the user extends the right thumb, the user can operate the triangle button 30b and the square button 30c on the far side when viewed from the right hand side without changing the gripping position of the casing 10. When the right thumb is flexed, the user can operate the circle button 30a and the cross button 30d on the close side when viewed from the right hand side. For identification of each of the buttons, protrusions or grooves and the like corresponding to circle, cross, triangle, and square signs may be provided on the surfaces of the buttons.

4. LR-Buttons

Recent video games require complicated operation. So, operation means sometimes would be short only with the arrow key and the button keys. Therefore, many controllers provide the LR-buttons so as to increase the number of operation means. In the portable electronic device 100 according to this embodiment, the LR-buttons 46 are provided on the top side face of the intermediate part 10b of the casing 10 as shown in FIGS. 1 and 2. On the top side face of the casing 10, two rectangular openings are formed at upper left corner and upper right corner of the front face. Alternatively, the rectangular opening may be formed at lower left corner or lower right corner. The body of each of the LR-buttons is fitted into the opening. The LR-buttons are press-type buttons. When the LR-buttons 46 are not pressed, the LR-buttons 46 exhibit such appearance that the LR-buttons 46 constitute a part of the intermediate part 10b. Moreover, as described above, the LR-buttons 46 are provided at the positions that the fingertips of the forefingers touch when the user grips the casing 10. Preferably, the pressed face of the L-button 46L, top side face and left side face of the casing 10 may form substantially continuous plane when the portable electronic device 100 is viewed from top for good appearance. Similarly, the pressed face of the R-button 46R, top side face and right side face of the casing 10 may form substantially continuous plane when the portable electronic device 100 is viewed from top. In other words, the pressed face of the L-button 46L, top side face and left side face of the casing 10 may exhibit the left outline corner of the long oval shape of the casing 10, and the pressed face of the R-button 46R, top side face and right side face of the casing 10 may exhibit the right outline corner of the long oval shape of the casing 10. Alternatively, the pressed face of the LR-button 46 and one side face of the casing 10, which is one of two side faces forming the corner of the casing 10 where the opening is situated, may form substantially continuous plane.

Figure 9A:
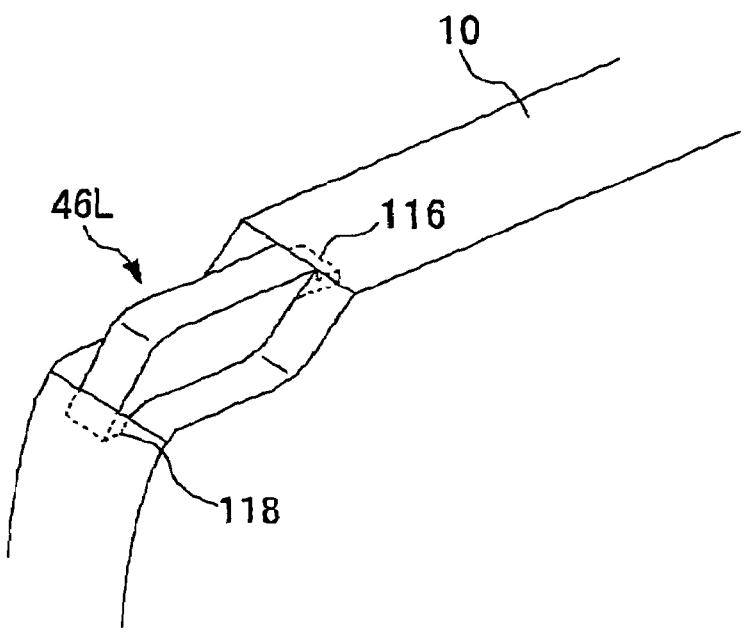
FIGS. 9A and 9B are views, each showing a structure of the LR-buttons according to a first example of the invention.
Figure 9B:
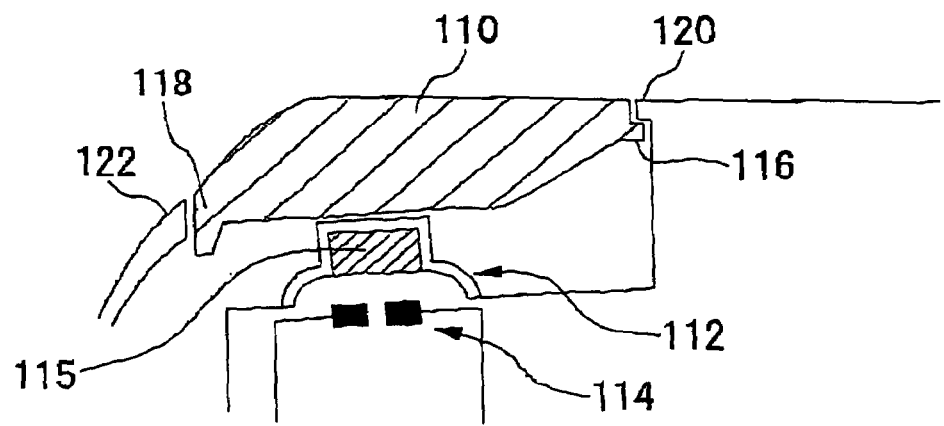

FIGS. 9A and 9B are views showing a first example of the structure of the LR-buttons 46. Although only the L-button 46L is described as an example herein, the R-button 46R is horizontally symmetrical to the L-button 46L and has the same structure. As shown in FIG. 9B, the L-button 46L includes: an elongated button body 110, a deformation member 112, a conductive member 115, and switch contacts 114. The deformation member 112 is provided so as to be opposed to the back of the button body 110. The elongated button body 110 has a pressed face by the user's finger, which is situated along the longitudinal direction of the button body 110. The back is a flip side of the pressed face. The conductive member 115 has conductivity, and is provided inside the deformation member 112. The switch contacts 114 are positioned below the conductive member 115. Seizing means 116 and 118 are provided on left and right ends in a longitudinal direction of the button body 110 as shown in FIG. 9B, respectively. Each of the seizing means 116 and 118 are provided to prevent the button body 110 from being detached from the casing 10. The seizing means 116 and 118 have different shapes. Each of the seizing means 116 and 118 extends in each direction of two side faces forming the corner of the casing 10 where the opening is situated. The seizing means 116 is a planar member, which extends in a longitudinal direction as a flange from right end of the button body 110 with approximately the same width as that of the button body 110. The planar member 116 has a step descending regard to the pressed face by the user's finger. The planar member 116 contacts against a receiving part 120, which extends from the casing 10 toward the button body 110 to be engaged with the planar member 116. The seizing means 118 is a vertical part, which is opposed to the contacting part 122 provided on the casing 10. The vertical part 118 extends downward from left side of the button body 110 and its end protrudes through the bottom of the button body 110. The contacting part 122 may be an approximately vertical section of the casing 10 as shown in FIG. 9B. The vertical part 118 and the contacting part 122 face against each other with certain spacing. The receiving part 120 and the contacting part 122 are situated at the limb of the opening.

The planar member 116 and the vertical part 122 extends only in a longitudinal direction of the button body 110 and has no flange in a direction perpendicular to the longitudinal direction of the button body 110. So, employment of the planar member 116 and the vertical part 122 as seizing means results in space savings and can apply to a thin casing such as the casing 10.

The deformation member 112 has an elongated shape along the top side face of the casing 10. The deformation member 112 is designed so as to be subjected to a load when any position of the button body 110 is pressed. As described above, when receiving the load, the leg 113 of the deformation member 112 is deformed. Then, the conductive member 115 provided inside the deformation member 112 allows the switch contacts 114 to be electrically conducted to turn a signal ON. Therefore, the leg 113 of the deformation member 112 is required to be designed to be appropriately deformed when the deformation member 112 is subjected to more than a predetermined load, and to be designed to come back to the original state when the load is removed. The deformation member 112 is made of a rubber, a silicone or a plastic, for example.

Figure 10A:
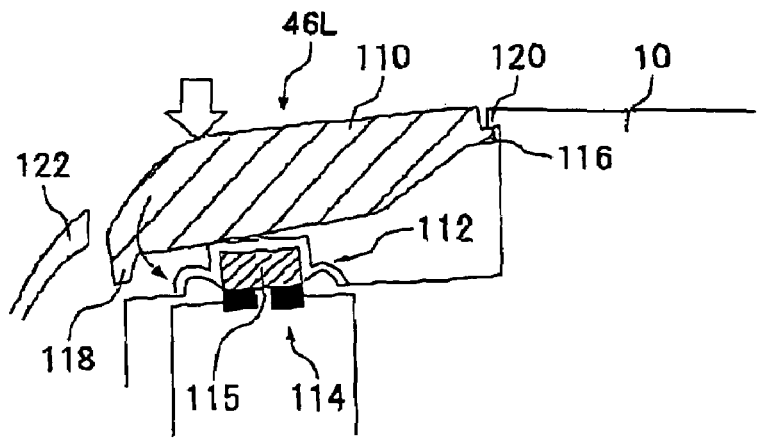
FIGS. 10A to 10C are views, each showing an operation of the LR-buttons according to the first example of the invention.
Figure 10B:
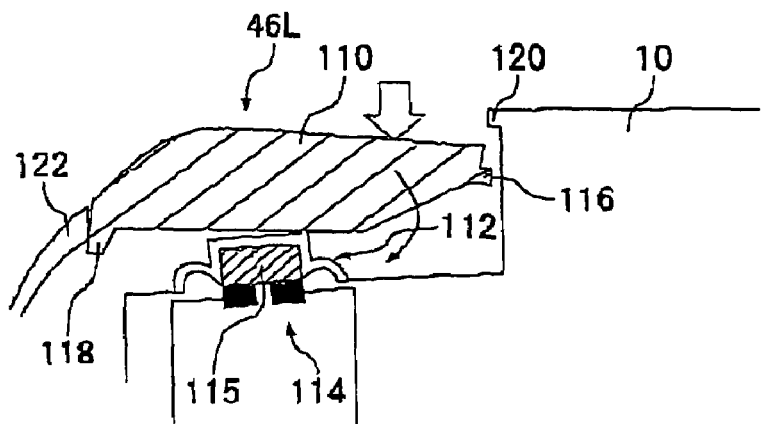
Figure 10C:
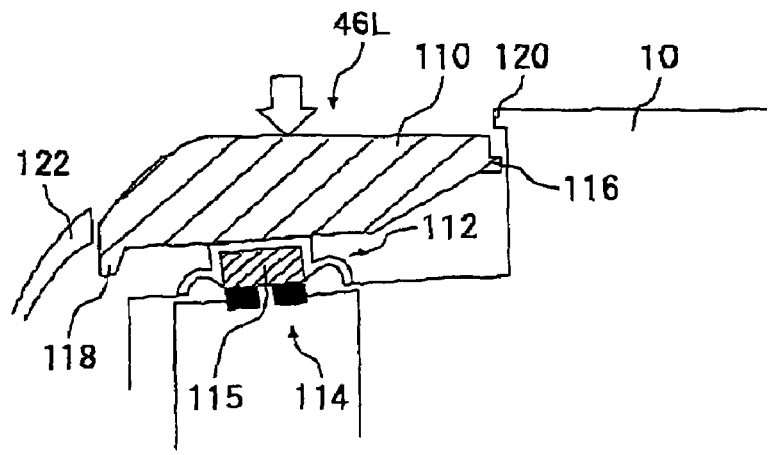

FIGS. 10A, 10B and 10C are views showing the operation of the L-button 46L according to the first example. The L-button 46L in this embodiment is characterized in that its supporting point is not fixed. FIG. 10A shows an appearance where the user presses the left of the button body 110, that is, the end on the edge side of the casing 10. When the button body 110 is pressed, the step of the planar member 116, corresponding to the first seizing means, is engaged with the receiving part 120 extending from the casing 10 to serve as a supporting point. The button body 110 slightly pivots about the supporting point in a direction indicated with an open arrow in FIG. 10A to press down the deformation member 112. At this time, the vertical part 118, corresponding to the second seizing means, is released from the contacting part 122 of the casing 10.

FIG. 10B shows an appearance where the user presses the right of the button body 110, that is, the end closer to the center of the casing 10. When the button body is pressed, a lower end of the vertical part 118, corresponding to the second seizing means, comes into contact with a lower end of the wall of the contacting part 122 of the casing 10 to serve as a supporting point. The button body 110 slightly pivots about the supporting point in a direction indicated with an open arrow in FIG. 10B to press down the deformation member 112. At this time, the planar member 116, corresponding to the first seizing means, is released from the receiving part 120 of the casing 10.

FIG. 10C shows an appearance where the user presses the center of the button body 110. When the button body is pressed, both the planar member 116 and the vertical part 118 are released from the receiving part 120 and contacting part 122 of the casing 10, respectively. The button body 110 moves downward to press down the deformation member 112.

Figure 11A:
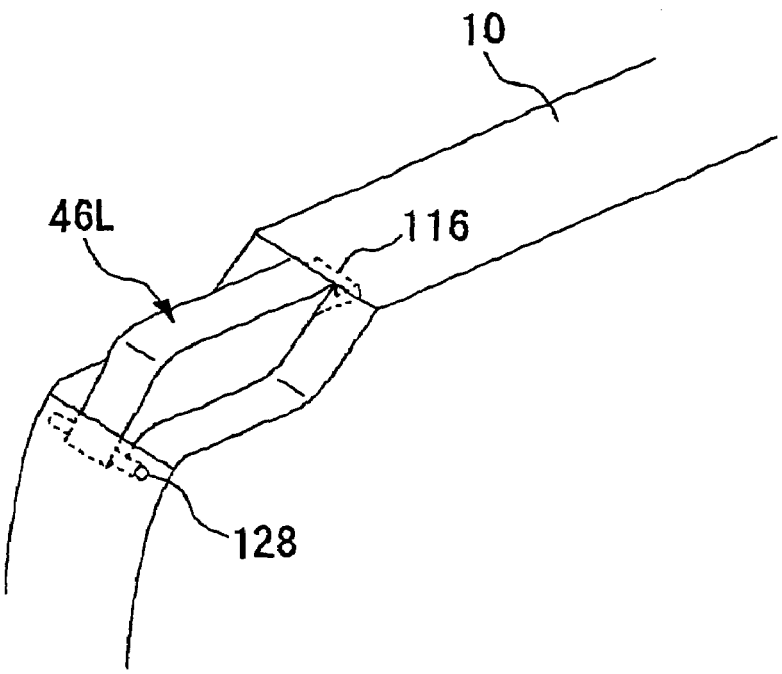
FIGS. 11A and 11B are views, each showing a structure of the LR-buttons according to a second example of the invention.
Figure 11B:
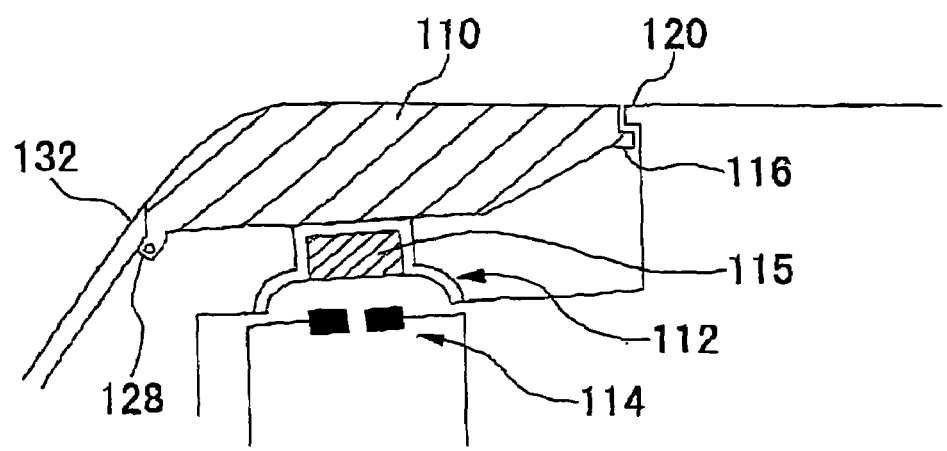

FIGS. 11A and 11B are views showing the second example of the structure of the LR-buttons 46. Again, although only the L-button 46L is described herein, the R-button 46R is horizontally symmetrical to the L-button 46L and has the same structure. As shown in FIG. 11B, the L-button 46L includes: the elongated button body 110, the deformation member 112, the conductive member 115, and the switch contacts 114, same as shown in FIG. 9B. The deformation member 112 is provided so as to be opposed to the back of the button body 110. The conductive member 115 has conductivity, and is provided inside the deformation member 112. The seizing means 116 and 128 are provided on both ends in a longitudinal direction of the button body 110, respectively. Each of the seizing means 116 and 128 contacts against the inner side of the casing 10 so as to prevent the button body 110 from being detached from the casing 10. The seizing means 116 and 128 have different shapes so as to contact against the corresponding receiving part 120 and 132 provided on the casing 10, respectively. The first seizing means is a planar member 116, which extends in a longitudinal direction as a flange from one end of the button body 110 with approximately same width as that of the button body 110. The planar member 116 has a step descending regard to the pressed face by the user's finger. The second seizing means is a rod-like member 128 extending from the other end of the button body 110 in a direction approximately perpendicular to the longitudinal direction of the button body 110. It is preferable that the rod-like member 128 is provided to extend from both sides of the button body 110 in a thickness direction as shown in FIG. 11A. However, the rod-like member 128 may be provided to extend only from either side. The structures and functions of the deformation member 112, the conductive member 115, and the switch contacts 114 are same with those of the first example.

The first and second seizing means are not required to have different shapes on both ends of the button body 110. Alternatively, both first and second seizing means may be the above-described planar member, vertical part or rod-like member. The first and second seizing means may have other shapes as long as they have such a structure that the button body 110 can be prevented from being detached from the casing 10.

Figure 12A:
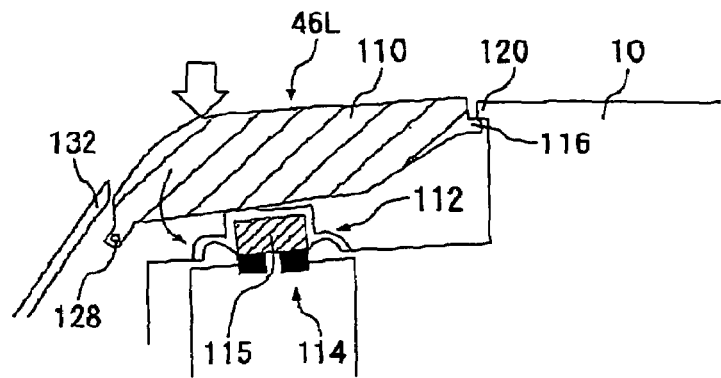
FIG. 12A to 12C are views, each showing an operation of the LR-buttons according to the second example of the invention.
Figure 12B:
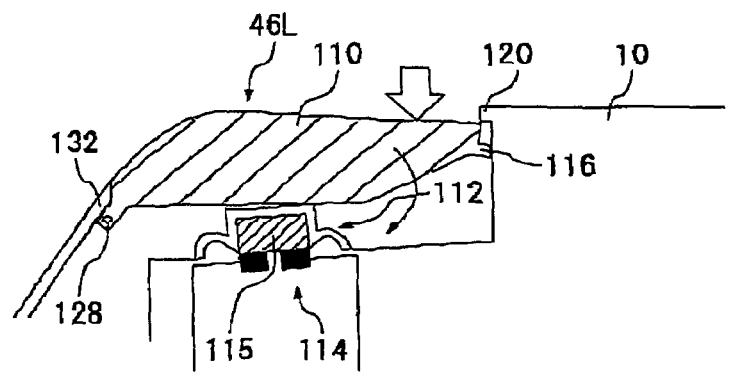
Figure 12C:
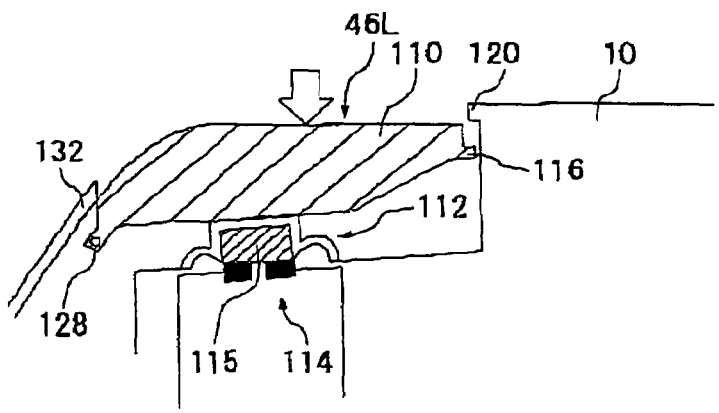
Figure 13A:
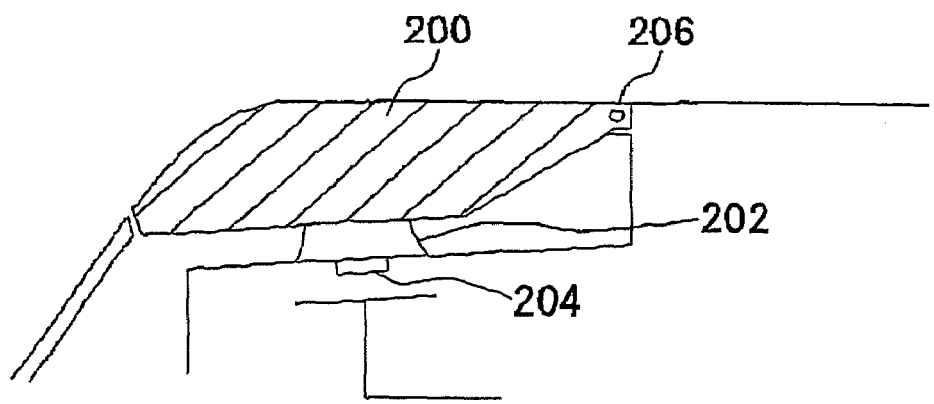
FIGS. 13A and 13B are views, each showing a structure of conventional LR-buttons.
Figure 13B:
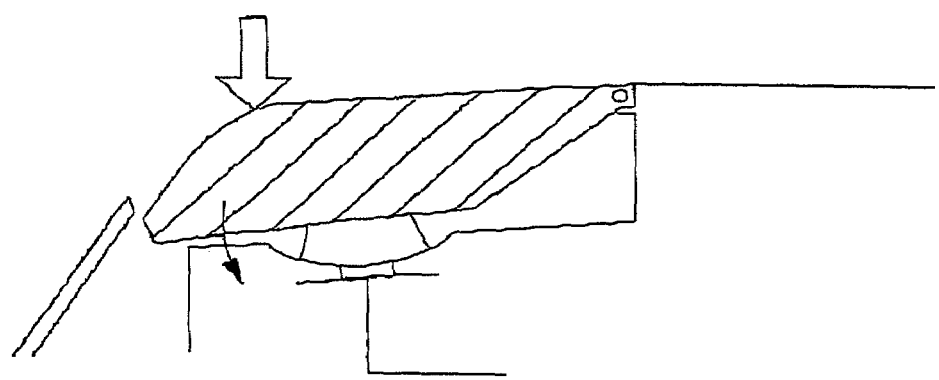

FIGS. 12A, 12B and 12C are views showing the operation of the L-button 46L according to the second example. FIG. 12A shows an appearance where the user presses the left of the button body 110, that is, the end on the edge side of the casing 10. When the button body 110 is pressed, the step of the planar member 116, corresponding to the first seizing means, comes into contact with receiving part 120 extending from the casing 10 to serve as a supporting point. The button body 110 slightly pivots about the supporting point in a direction indicated with an open arrow in FIG. 12A to press down the deformation member 112. At this time, the rod-like member 128, corresponding to the second seizing means, is released from the inner side 132 of the casing 10.

FIG. 12B shows an appearance where the user presses the right of the button body 110, that is, the end of the button body 110 closer to the center of the casing 10. At this time, the rod-like member 128, corresponding to the second seizing means, comes into contact with the inner side 132 of the casing 10 to serve as a supporting point. The button body 110 slightly pivots about the supporting point in a direction indicated with an open arrow in FIG. 12B to press down the deformation member 112. At this time, the planar member 116, corresponding to the first seizing means, is released from the receiving part 120 extending from the casing 10.

FIG. 12C shows an appearance where the user presses the center of the button body 110. At this time, both the planar member 116 and the rod-like member 128 are released from the receiving parts 120 and the inner side 132 of the casing 10, respectively. The button body 110 moves downward to press the deformation member 112.

As mentioned in the first and second examples, the LR-button is constituted to have a both-end supporting structure so that the operation of the button body is switched between pivoting about the right supporting point, pivoting about the left supporting point or moving vertically depending on the pressed position of the button body.

Although the position on the LR-buttons 46 that is easy to be pressed differs depending on the size of the hands and the finger lengths of the user gripping the casing 10, an instruction can surely be input to the portable electronic device 100 even when any position of the button body 110 is pressed according to the LR-button structure of this embodiment. Therefore, the operability of the portable electronic device 100 is improved. In addition, even when any position of the button body 110 of the LR-button 46 is pressed, the user can feel a click of the LR-buttons because the LR-buttons moves downward by a certain distance when the user presses the button.

When a game creator conceives the game contents, he/she must take the operability of a controller into account. In this sense, the functions of the controller and the game contents are in close relation with each other. In other words, the game contents are often restricted by the functions or the operability of the controller. The portable electronic device according to this embodiment has the operation buttons including the arrow key, the analog device, the button keys, and the LR-buttons, which are equivalent to or superior to the functions of the controller of a stay-at-home type game machine although its size is compact. Since a conventional portable game machine is not equipped with various operation buttons, the feasible game contents are restricted or a game program is required to be changed when some stay-at-home type game is ported to the portable game machine. In the portable electronic device according to this embodiment, however, such problems do not arise. Thus, the sphere of creation by game creators can be expanded.

As described above, according to the present invention, the portable electronic device with high operability and extensibility can be provided in such a compact size casing that the user can grip with both hands.

The present invention has been described based on some embodiments. The above-described embodiments are merely exemplary. Thus, those skilled in the art would understand that various modifications are possible in combinations with the components and such modifications are within the scope of the present invention. Moreover, an arbitrary combination of the components described in the embodiments is also effective as an embodiment of the present invention.

The structure or the arrangement of the buttons according to the invention may be also applicable to a controller for a stay-at-home type game machine.

What is claimed is:

1. An electronic device comprising:
a casing having a display on its front face, ends of which being gripped by both hands of a user, said casing being comprised of a front face, a rear face and one or more side faces, the
side faces including a top side face, a bottom side face, a left side face and a right side face; and at least one button operation means provided on the side face of said casing; said button operation means further comprising:
an elongated button body, wherein said button body is operated by the user's forefinger or middle finger aligned with the longitudinal direction of said button body;
a deformation member being pressed by a back of said button body when said button body is pressed down, the back being a flip side of a face pressed by the user; and
switch contacts being electrically conducted due to the deformation of the deformation member; wherein
a first seizing means is provided on a side of the button body close to a center of the casing, said first seizing means extending as a flange in a longitudinal direction;
a second seizing means is provided on a side of the button body close to one of the left or right side faces of the casing, said second seizing means facing a section of the casing;
wherein there is a clearance between each of said first and second seizing means and the inner wall of casing so that each of said first and second seizing means may contact against an inner wall of the casing to pivot about the contact point or alternatively may be disengageable toward an inside of the casing;
when the side of the button body close to the side face of the casing is pressed, said first seizing means on the opposite side of the pressed side comes into contact with the inner wall of the casing to function as a pivot point, and said second seizing means on the pressed side disengages from the inner wall of the casing to pivot about the pivot point to the pressed direction;
wherein the first and second seizing means are separated in the longitudinal direction of said button body, said first seizing means being a planar member extending in a longitudinal direction from one end of said button body with a step from the pressed face, and said second seizing means being a vertical part formed in another end of said button body; and
wherein when said button body is not pressed, said step of the planar member is engaged with a corresponding receiving part extending from said casing and said vertical part comes into contact with the section of said casing.

2. The electronic device according to claim 1, wherein when a vicinity of center of said button body is pressed, both said first and second seizing means are disengaged from the inner wall of the casing and said button body moves downward.

3. The electronic device according to claim 1, wherein when any position of said button body is pressed, said deformation member is deformed in accordance with the pressed position to allow said switch contacts to be electrically conducted.

4. The electronic device according to claim 1, said deformation member being made of a rubber.

5. The electronic device according to claim 1, said button operation means being provided at a position where an operation by any one of a forefinger and a middle finger of the user is easy when said casing is gripped by the user.

6. The electronic device according to claim 5, said button operation means being provided in a notch formed on the side face of said casing.

7. The electronic device according to claim 1, wherein the surface of said first and second seizing means contacts against a limb of the opening of the casing so as to prevent the button body from being detached from the opening of the casing.

8. The electronic device according to claim 1, when the side of the button body close to the center of the casing is pressed, said second seizing means on the opposite side of the pressed side comes into contact with the inner wall of the casing to function as a pivot point, said first seizing means on the pressed side disengages from the inner wall of the casing to pivot about the pivot point to the pressed direction.

9. A game controller comprising:
a casing, ends of which being gripped by both hands of a user, said casing being comprised of a front face, a rear face and one or more side faces, the side faces including a top side face, a bottom side face, a left side face and a right side face; and
at least one button operation means provided on the side face of said casing;
said button operation means further comprising:
an elongated button body wherein said button body is operated by the user's forefinger or middle finger aligned with the longitudinal direction of said button body;
a deformation member being pressed by a back of said button body when said button body is pressed down, the back being a flip side of a face pressed by the user; and
switch contacts being electrically conducted due to the deformation of the deformation member; wherein
a first seizing means is provided on a side of the button body close to a center of the casing, said first seizing means extending as a flange in a longitudinal direction;
a second seizing means is provided on a side of the button body close to one of the left or right side faces of the casing, said second seizing means facing a section of the casing;
wherein there is a clearance between each of said first and second seizing means and the inner wall of casing so that each of said first and second seizing means may contact against an inner wall of the casing to pivot about the contact point or alternatively may be disengageable toward an inside of the casing;
when the side of the button body close to the side face of the casing is pressed, said first seizing means on the opposite side of the pressed side comes into contact with the inner wall of the casing to function as a pivot point, and said second seizing means on the pressed side disengages from the inner wall of the casing to pivot about the pivot point to the pressed direction;
wherein the first and second seizing means are separated in the longitudinal direction of said button body, said first seizing means being a planar member extending in a longitudinal direction from one end of said button body with a step from the pressed face, and said second seizing means being a vertical part formed in another end of said button body; and
wherein when said button body is not pressed, said step of the planar member is engaged with a corresponding receiving part extending from said casing and said vertical part comes into contact with the section of said casing.

10. The game controller according to claim 9, wherein when a vicinity of a center of said button body is pressed, both said first and second seizing means are disengaged from the inner wall of the casing and said button body moves downward.

11. The game controller according to claim 9, wherein when any position of said button body is pressed, said deformation member is deformed in accordance with the pressed position to allow said switch contacts to be electrically conducted.

12. The game controller according to claim 9, said deformation member being made of a rubber.

13. The game controller according to claim 9, said button operation means being provided at a position where an operation by any one of a forefinger and a middle finger of the user is easy when said casing is gripped by the user.

14. The game controller according to claim 13, said button operation means being provided in a notch formed on the side face of said casing.

15. The electronic device according to claim 9, when the side of the button body close to the center of the casing is pressed, said second seizing means on the opposite side of the pressed side comes into contact with the inner wall of the casing to function as a pivot point, said first seizing means on the pressed side disengages from the inner wall of the casing to pivot about the pivot point to the pressed direction.

* * * * *

UNITED STATES PATENT AND TRADEMARK OFFICE
CERTIFICATE OF CORRECTION

| | |
|---|---|
| PATENT NO. | : 7,625,286 B2 |
| APPLICATION NO. | : 11/121687 |
| DATED | : December 1, 2009 |
| INVENTOR(S) | : Nobutoshi Hamada |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this

Twenty-sixth Day of October, 2010

David J. Kappos
*Director of the United States Patent and Trademark Office*